June 5, 1928.
A. MONSEN
VEHICLE STEERING GEAR
Filed Aug. 6, 1925
1,672,334
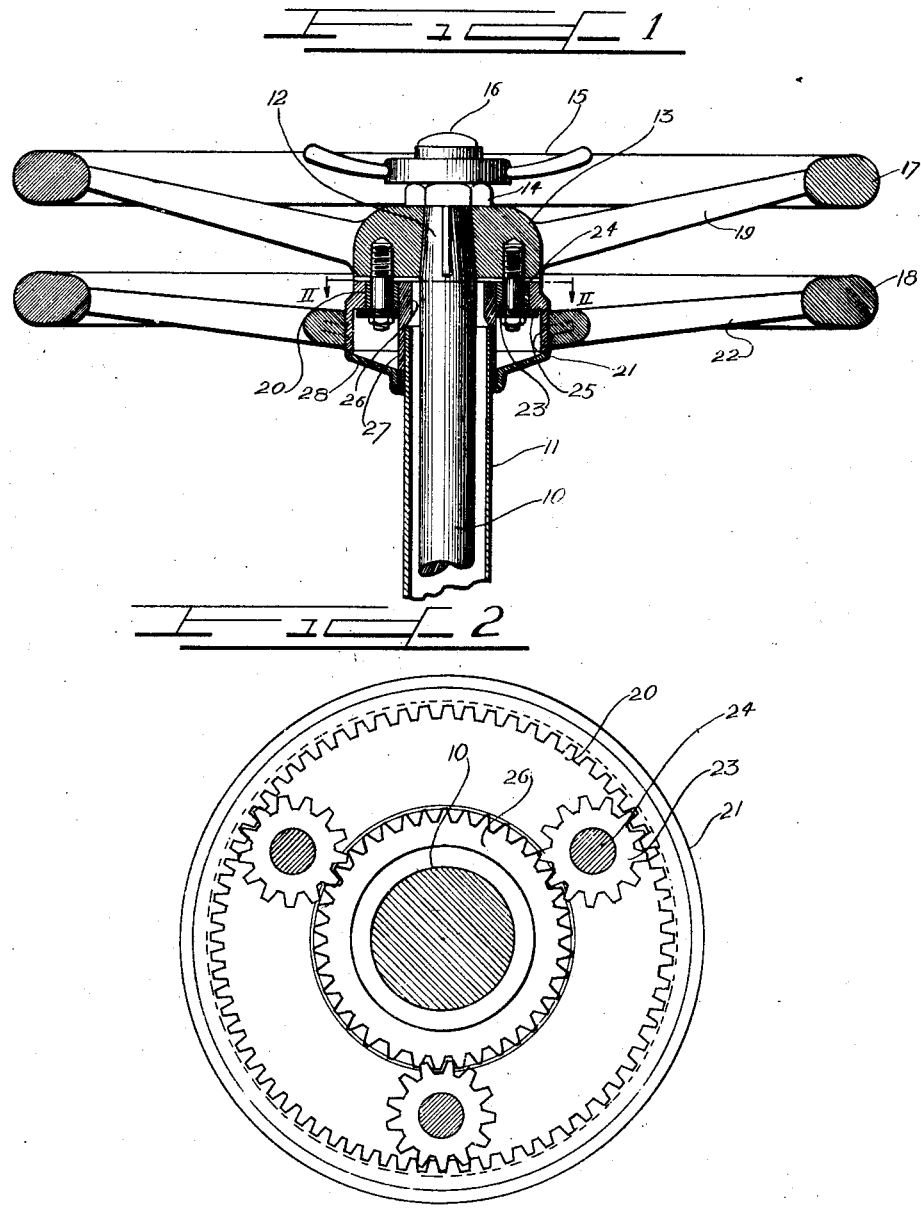
Inventor
Adolph Monsen Patented June 5, 1928.

1,672,334

UNITED STATES PATENT OFFICE.

ADOLPH MONSEN, OF LOGANSPORT, INDIANA.

VEHICLE STEERING GEAR.

Application filed August 6, 1925. Serial No. 48,467.

This invention relates to the steering control of heavy load carrying vehicles such as trucks and the like, and is equally adaptable for pleasure cars or any wheeled motor vehicle.

It is an object of this invention to provide a steering mechanism of the normal type with an auxiliary steering mechanism giving twice the normal leverage for use under heavily loaded conditions wherein the normal mechanism can be operated only by the expenditure of considerable effort. With the large heavy duty trucks now in common use, the steering mechanism is given a large reduction ratio because in a loaded condition it requires an enormous amount of power to turn the front wheels. When the truck is unloaded or in light condition such a large reduction is not required and simply slows down the control of the vehicle. By providing an auxiliary mechanism doubling the normal reduction ratio, the ratio may be originally established to give a responsive control for ordinary driving with the double ratio in reserve for maneuvering in close quarters where it is desirable and sometimes essential to shift the wheels while the truck is standing still.

It is also an object of this invention to provide a double ratio steering mechanism of the class described applicable as replacement equipment for existing vehicles to improve the maneuverability thereof.

Other and further important objects of this invention will be apparent from the disclosures of the specification and drawings.

The invention (in a preferred form) is illustrated in the drawings and hereinafter more fully described.

On the drawings:

Figure 1 is a vertical section through the top of a steering column showing the device of this invention applied thereto.

Figure 2 is an enlarged section on the line II—II of Figure 1.

As shown on the drawings:

The usual steering post 10 is shown together with an enclosing stationary sleeve 11, the post being tapered at the top 12 for engagement with a steering wheel hub 13 clamped thereto by the nut 14, the usual spark and throttle controls 15 and horn button 16 being indicated. Steering wheel rims 17 and 18 are provided the upper one 17 of which is connected to the hub 13 by the spokes 19 and differs in no material way from the usual form of wheel except for the hub 13.

The hub is broadened out to present a wide lower surface sufficient to cover an internal ring gear 20 having a depending flange 21 to which the spokes 22 carrying the second steering wheel rim 18 are secured. Pinions 23 engage in the ring gear and are freely pivoted on the studs 24 mounted in the hub 13. A washer 25 is mounted below the pinions and is large enough to cover the teeth of the ring gear and thereby also supports the ring gear and attached steering wheel. The pinions 23 engage a gear 26 clamped by the sleeve 27 to the stationary enclosing tube or sleeve 11, the enclosure being completed by the member 28 screwed onto the bottom of the sleeve 27. Such closure effectively protects the gears from the elements. It will be evident from the gear train layout shown in Figure 2 that when the lower steering wheel 18 is rotated the planetary pinions 23 will be rotated upon the stationary central gear 26, so that the shafts upon which the pinions turn will be advanced at half the rate of movement of the lower wheel, the turning movements of the pinions being transmitted through the hub 13 of the upper wheel 17 to rotate the steering post or shaft 10.

It will be evident from the foregoing that the entire mechanism is self-contained and may be applied to existing vehicles to replace the customary single steering wheel. The only possible need of fitting in such installations replacing standard steering wheels will be in the adjustment of the tube or sleeve 11 which may have to be moved up or down relative to the post.

I am aware that numerous details of construction may be varied through a wide range without departing from the principles of this invention, and I therefore do not purpose limiting the patent granted otherwise than necessitated by the prior art.

I claim as my invention:

1. In a steering control for vehicles a pair of steering wheels, a hub for one wheel secured to the steering column of the vehicle, a ring gear forming the hub of the other wheel, pinions carried by the first mentioned hub and engaging the ring gear, and a stationary gear engaging said pinions and adapted to give an increased leverage to the wheel carried by the ring gear relative to the other wheel.

2. In a device of the class described, a pair of steering wheels mounted adjacently upon the steering column of a vehicle, and planetary gearing comprising a ring gear connected to one of said steering wheels, a stationary gear, and pinions located between said gears, secured to the other of said steering wheels, adapted to increase the leverage of one of the said steering wheels.

3. In a vehicle steering control, a pair of steering wheels mounted on a steering column, and coplaner planetary gearing interconnecting said wheels, said gearing being enclosed by the hub of one of said wheels.

4. In a vehicle steering control, the combination with a steering rod and sleeve, of a steering wheel mounted on said steering rod, a second steering wheel mounted adjacent and rotatably secured to the first mentioned wheel, a stationary gear supported on said sleeve, pinions carried by the first mentioned wheel engaging said gear, and a ring gear carried by said second wheel engaging said pinions, whereby said second wheel is given increased leverage relative to said first mentioned wheel.

5. In a vehicle steering control, the combination with a steering rod and sleeve, of a steering wheel mounted on the steering rod, a second steering wheel adjacent thereto, means indirectly connecting the same to said sleeve and steering rod, said means comprising a stationary gear supported by said sleeve, pinions carried by the first mentioned wheel and engaging said gear, a ring gear carried by said second wheel and engaging said pinions to increase the leverage of the second wheel over that of the first mentioned wheel.

6. In a device of the class described, a pair of steering wheels, a support for said wheels, and gearing interconnecting said wheels, the hub of one of said wheels enclosing said gearing, and the hub of the other of said wheels overlapping said first mentioned hub.

7. In a device of the class described, a pair of steering wheels, a support for said wheels, gearing interconnecting said wheels, the hub of one of said wheels enclosing said gearing, the hub of the other of said wheels overlapping said first mentioned hub, and a closure member associated with said support to aid in forming a protective housing for said gearing.

In testimony whereof I have hereunto subscribed my name.

ADOLPH MONSEN.